United States Patent [19]
Christoph

[11] 4,250,778
[45] Feb. 17, 1981

[54] PORTABLE FACING MACHINE

[76] Inventor: Dieter Christoph, 407 Walnut Dr., Streamwood, Ill. 60103

[21] Appl. No.: 939,920

[22] Filed: Sep. 5, 1978

[51] Int. Cl.² .......................... B23B 3/22; B23B 3/00
[52] U.S. Cl. ........................................ 82/4 R; 82/2 A
[58] Field of Search ................. 82/4 R, 4 C, 2 A, 2 E

[56] References Cited

U.S. PATENT DOCUMENTS

| | | | |
|---|---|---|---|
| 107,918 | 10/1870 | Jones | 82/2 E |
| 167,038 | 8/1875 | Stevens | 82/4 R |
| 3,141,365 | 7/1964 | Peters | 82/4 C |
| 3,273,432 | 9/1966 | Hasund | 82/4 R |

Primary Examiner—Harrison L. Hinson

[57] ABSTRACT

This invention relates to a portable facing machine for cutting a large flat face on a large piece of equipment. The machine includes a frame, which is adapted for supporting the machine in a selected attitude. A spindle support is mounted on the frame and is longitudinally movable in the frame. A head depth control is connected to the spindle support and moves the spindle support relative to the frame and locks the spindle support in a selected position relative to the frame. A cutter support is rotatably mounted in the spindle support and moves with the spindle support. The cutter support includes a head, with a slide mounted in the head. The slide is radially movable in the head. A cutting tool assembly, including a cutting tool, is mounted on the slide, is rotatable with the cutter support, and is radially movable relative to the head. A head drive is connected to the head for rotating the cutter support. A radial drive is connected to the slide for selectively moving the slide radially in the head while the head is rotating on the spindle support.

11 Claims, 6 Drawing Figures

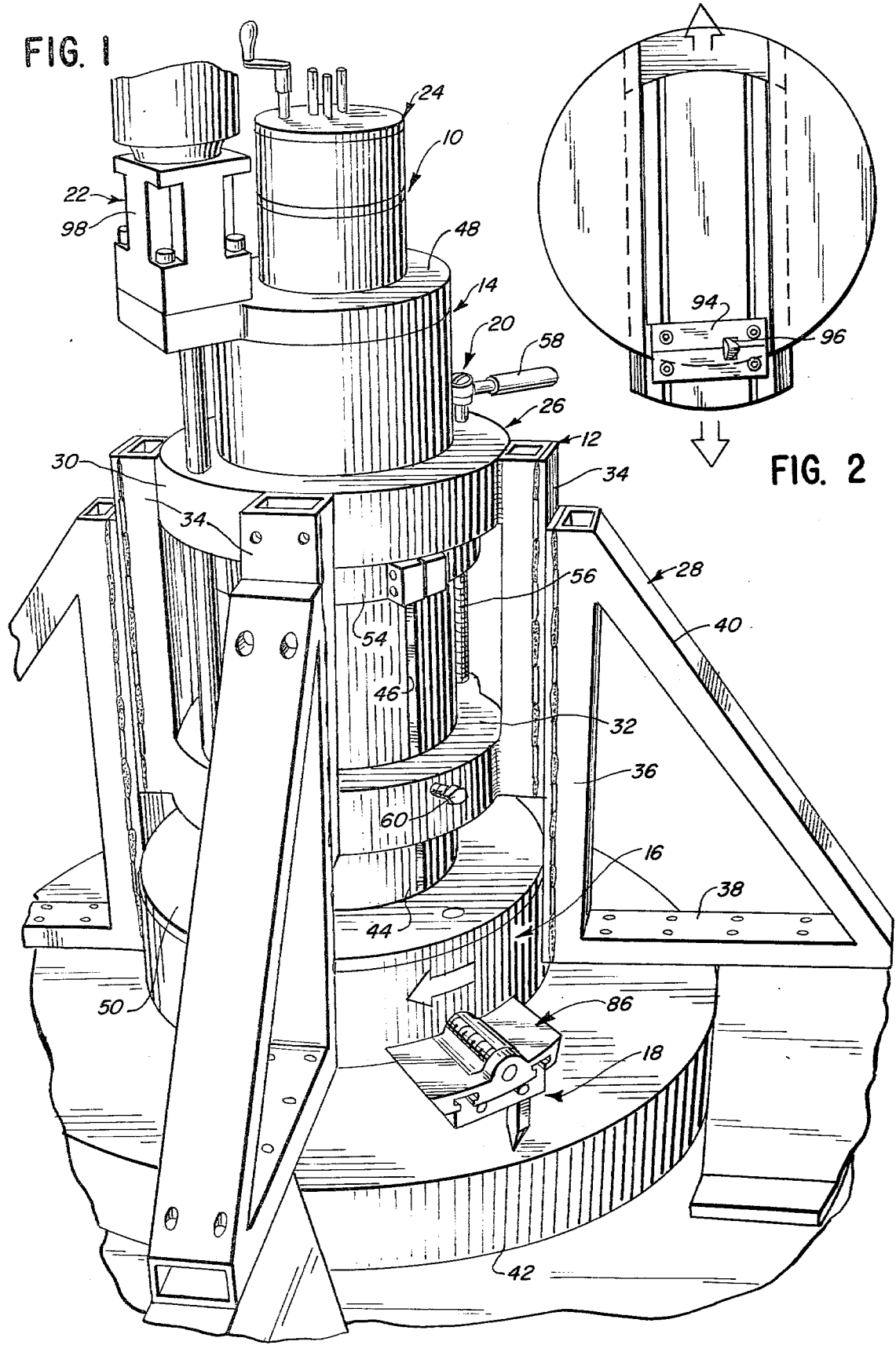

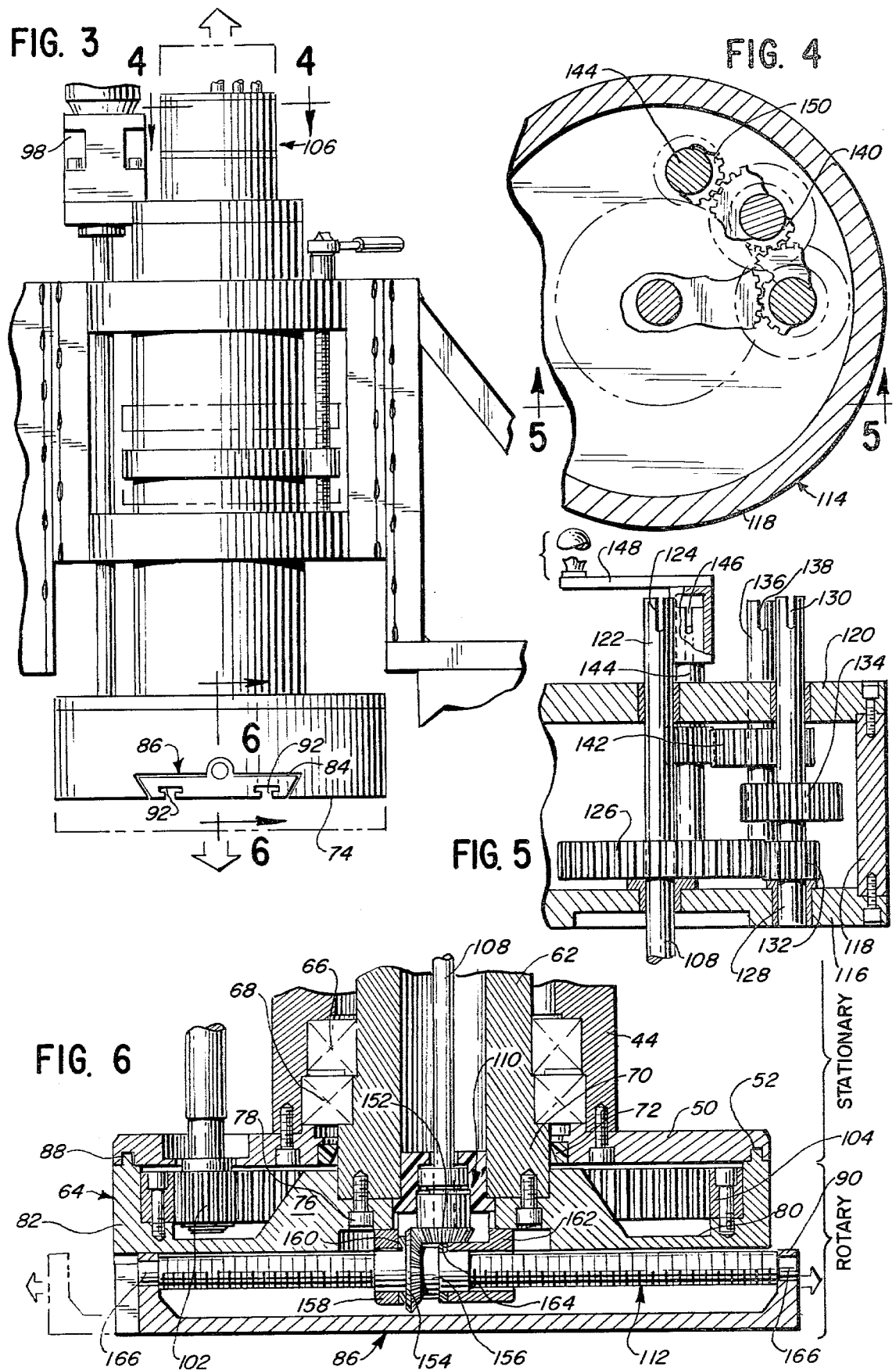

PORTABLE FACING MACHINE

BACKGROUND OF THE INVENTION

Most power-generating stations include numerous large pieces of equipment, through which a substantial quantity of superheated steam is delivered to a steam turbine and then returned to a steam generator. Power-generating stations generally operate continuously as a source of electrical energy in a given geographic area. Periodically, the entire station (or a part of the station) must be shut down in order to perform repairs and preventive maintenance on the equipment. In view of the large size of the equipment and in view of the fact that it is desirable to get the station back on line at the earliest possible time with a minimum of shutdown time, it has been found desirable to move machine tools into a power-generating station to perform the necessary maintenance and repairs on the equipment. One of the problems which is encountered in making necessary maintenance and repairs on equipment is that it is often necessary to reface flange couplings and the like in order to have a perfectly flat face, so that seals may be effected when the equipment is reassembled after a period of work on the equipment. Heretofore, there has been no equipment available which is portable and may be used to cut a flat surface on a piece of equipment. All too often, hand-grinding wheels were used to remove scale, rust and other materials from a flange, which resulted in an uneven surface. It is a principal object of this invention to provide a portable facing machine which may be transported to a power-generating station to cut a flat face on a large piece of equipment for flanges having a diameter of six feet and larger.

SUMMARY OF THE INVENTION

A portable facing machine for cutting a flat face on a surface is the subject matter of this invention. The machine includes a frame having a core and a plurality of legs adjustably connected to the core for supporting the machine. A spindle support is mounted in the core. The spindle support is longitudinally movable in the core. A head depth control is connected to the core and to the spindle support for moving the spindle support relative to the core and holding the spindle support in a selected position. A cutter support is rotatably mounted in the spindle support and is movable with the spindle support relative to the frame. The cutter support includes a head, which head has a slide mounted therein. A cutting tool assembly is mounted on the slide. A head drive is mounted on the spindle support and is drivingly connected to the head for rotating the head relative to the spindle support and carrying with it the cutting tool assembly. A radial drive is mounted on the spindle support and is connected to the slide for moving the slide radially relative to the head for moving a cutting tool of the cutting tool assembly across a workpiece while the cutting tool is rotating to cut a flat surface.

BRIEF DESCRIPTION OF THE DRAWINGS

FIG. 1 is a perspective view of a portion of a portable facing machine embodying the present invention, shown mounted adjacent to a workpiece for cutting a flat face on a workpiece;

FIG. 2 is a bottom view of a head and a slide of the portable facing machine of FIG. 1;

FIG. 3 is a side elevational view of a portion of the portable facing machine of FIG. 1, with a portion of the legs broken away;

FIG. 4 is an enlarged partial cross-sectional view taken on Line 4—4 of FIG. 3, showing a gear box and an interrelationship between a plurality of gears of a radial drive;

FIG. 5 is a partial cross-sectional view taken on Line 5—5 of FIG. 4; and

FIG. 6 is a cross-sectional view through a portion of the portable facing machine, taken on Line 6—6 of FIG. 3, showing a cross-sectional view of the head and connection of a portion of the radial drive with the slide in the head.

DESCRIPTION OF THE PREFERRED EMBODIMENT

Referring now to the drawings, and especially to FIG. 1, a portable facing machine embodying the present invention is shown therein and generally indicated by numeral 10. The portable facing machine generally includes a frame 12 and a spindle support 14 slideably mounted on the frame. A cutter support 16 is rotatably mounted in the spindle support. A cutting tool assembly 18 is mounted on the cutter support for rotation with the cutter support. A head depth control 20 is connected to the frame and to the spindle support for longitudinally positioning the spindle support relative to the frame. The cutter support is connected to a head drive 22, which rotates the cutter support in the spindle support. A radial drive 24 is connected to the cutting tool assembly for radially positioning the cutting tool assembly in the cutter support.

Frame 12 generally consists of a core 26, with four identical legs 28 adjustably connected to the core. The core includes an upper support ring 30 and a lower support ring 32. Four identical columns 34 are secured to the rings. Each column 34 has one end welded to upper support ring 30 and the other end welded to lower support ring 32 to hold the rings spaced from each other in alignment with each other. Each column 34 contains a plurality of adjustment slots (which are not shown) for connecting a respective leg 28 to the column in a selected relationship.

As was mentioned above, legs 28 are identical in construction to each other. Each of the legs has a triangular configuration and includes a leg column 36, with a base 38 fixed to one end of the leg column perpendicular to the leg column. A bracket 40 has one end connected to the leg column and the other end connected to the brace. The leg column has a plurality of slots contained therein, so that the leg column may be selectively positioned and secured to its respective column 34 of the core. It may be appreciated that, although legs 28 of the machine are shown in FIG. 1 as supporting the machine upon supports above a workpiece 42, legs 28 could be inverted so that base 38 would be positioned above head drive 22 and allow the machine to be suspended over workpiece 42.

The spindle support generally includes a hollow cylindrical housing 44, having an elongated groove 46 in its outer surface, which groove is parallel to the axis of the housing. The housing has a cover plate 48 mounted on its upper end, which cover plate supports the head drive 22. A flat circular head plate 50 is fastened to the opposite end of housing 44. Head plate 50 contains an annular head groove 52 adjacent to its outer periphery.

Head depth control 20 includes a control ring 54, which ring is secured to cylindrical housing 44. The control ring has a tongue (which is not shown), which tongue is positioned in groove 46. A depth lead screw 56 is threadedly connected to control ring 54, and the depth lead screw has its lower end rotatably mounted in lower support ring 32 and the upper end extending out from upper support ring 30. A ratchet handle 58 is mounted on that portion of the depth lead screw 56 which extends through upper support ring 30 so that the screw may be readily rotated. A lock screw 60 is mounted in lower support ring 38 and extends into groove 46 to prevent rotation of housing 46 in core 26.

Cutter support 16 has as its principal elements a hollow cylindrical spindle 62 and a head 64 fixed to the spindle. Spindle 62 has one end positioned adjacent to the cover plate 48, and is supported there by a conventional thrust bearing (which is not shown). At the other end of the spindle, a roller bearing 66 is positioned between the exterior of the spindle and the interior of housing 44, as may be best seen in FIG. 6. A ball bearing 68 is mounted adjacent to roller bearing 66 and is also mounted between the exterior of spindle 62 and the interior of housing 44. The spindle has a base 70 at its one end; and a seal 72 is mounted in sealing engagement between base 70 and an interior edge of head plate 50.

Head 64 is generally cylindrical, and has a flat working surface 74. The head includes a mount 76, which is secured to base 70 by a plurality of fasteners 78. The mount is connected to a floor 80, which has a cylindrical side wall 82 formed integral therewith. The floor also defines a generally dovetailed slide groove 84, which has a dovetail slide 86 slideably mounted therein. The side wall has an annular seal ring 88 formed therein, which seal ring mates with head groove 52 to provide a seal between the head plate and the head.

Dovetail slide 86 has a conventional dovetail cross-section, as may be best seen in FIG. 3. The slide has a pair of identical shaft supports 90 at opposite ends of the slide. The slide also has a pair of conventional T-slots 92, into which is mounted the cutting tool assembly. Slide groove 84 extends diametrically across head 64; and dovetail slide 86 fills the slit to provide a substantially continuous working surface 74.

Cutting tool assembly 18, which may be best seen in FIGS. 1 and 2, includes a conventional tool holder 94, which is conventionally mounted in the T-slots 92. A conventional cutting tool 96 is replaceably mounted in the tool holder 94.

Head drive 22 rotates cutter support 16 in spindle support 14. The head drive includes a conventional fluid motor assembly 98, including a conventional fluid motor supported by the cover plate 48. A drive shaft 100 has one end connected to fluid motor drive assembly 98. The drive shaft extends through apertures in upper support ring 30 and lower support ring 32, and through an aperture in head plate 50. A pinion 102 is fixed to the other end of the drive shaft, as may be seen in FIG. 6. An internal ring gear 104 is mounted on the interior of side wall 82 of head 64. The internal ring gear meshes with drive pinion 102, so that fluid motor assembly 98 turns head 64 through drive shaft 100, pinion 102 and internal ring gear 104.

Dovetail slide 86 is moved radially relative to slide groove 84 by means of radial drive 24. The radial drive generally includes an input gear box 106, mounted on cover plate 48, an input shaft 108 drivingly connected to input gear box 106, a bevel gear drive 110 connected to the input shaft and a radial drive lead screw 112 connected to the bevel gear drive and mounted in the dovetail slide.

Input gear box 106 generally includes a housing 114 having a floor 116, a cylindrical side wall 118, and a housing cover 120. Input shaft 108 has an outer end 122, which outer end extends through housing cover 120. The outer end includes a slot 124 for accepting a handle to turn the shaft. A shaft gear 126 is fixed to input gear 108. In this instance, gear 126 has 56 teeth. A first gear shaft 128 has one end supported in floor 116, and the other end extends through housing cover 120, with a slot 130 contained in the end of the shaft. A first pinion 132, which is fixed to shaft 128, meshes with gear 126. Pinion 132 has 16 teeth. A second drive gear 134 is fixed to shaft 128. A second gear shaft 136 has one end rotatably mounted in the floor 116 and its opposite end extending upward through cover 120. Shaft 136 also has a slot 138. A second pinion 140 is fixed to shaft 136 and meshes with gear 134. Second pinion 140 has 16 teeth, and gear 134 has 32 teeth. A third gear 142 is fixed to shaft 136 and has 32 teeth. A third shaft 144 has one end rotatably mounted in floor 116 and the other end extending through the cover 120. Shaft 144 also contains a slot 146, which is adapted to receive a handle 148. A third pinion 150 is fixed to shaft 144 and meshes with gear 142. Pinion 150 has 16 teeth.

Bevel gear drive 110 is best seen in FIG. 6. The bevel gear drive includes a driven bevel gear 152 fixed to the other end of input shaft 108. A driven bevel gear 154 meshes with the drive bevel gear 152. The driven bevel gear is fixed to a lead screw nut 156, which lead screw nut is threadedly mounted on lead screw 112. A bevel gear bearing 158 is fixed to mount 76 and rotatably supports driven bevel gear 154. A thrust bearing 160 is positioned between the driven bevel gear and the bevel gear bearing. A nut stop 162 rotatably supports nut 156. A thrust bearing 164 is positioned between nut stop 162 and lead screw nut 156. The lead screw 112 has its opposed ends 166 fixed in respective shaft supports 90.

Machine 10 is placed into operation by first positioning the machine adjacent to a workpiece, such as, workpiece 42. Machine 10 is shown in FIG. 1 having legs 28 secured to columns 34, so that working face 74 is below the surface of base 38 of each of the legs. It may be appreciated that the legs may be raised or lowered relative to the columns in order to have the machine in approximately the proper position for machining. As was mentioned above, the legs could be inverted. The legs are also adapted for mounting on a workpiece so that the machine is supported on the workpiece.

After the machine is properly positioned, the head is lowered into position adjacent to the workpiece. The head is lowered by operating handle 58 of the head depth control to turn the depth lead screw 56 to lower the spindle support and cutter support 16 until cutting tool 96 is in position.

Head drive 22 is activated by providing fluid under pressure to the fluid motor assembly to turn drive shaft 100, which in turn rotates drive pinion 102. The drive pinion meshes with internal gear 104 to rotate the head on spindle 62. As the head is rotating, the cutting tool is further lowered by operating ratchet handle 58 to a depth as required. While the head is rotating, the cutting tool may be selectively moved radially relative to the head.

Radial drive 24 provides a variety of feeds for moving the cutting tool. The fastest feed is the direct drive, wherein handle 148 is positioned on the upper end of input shaft 108; and shaft 108 is rotated to turn drive bevel gear 152, which in turn drives driven bevel gear 154 to rotate lead screw nut 156 on lead screw 112. It may be appreciated that, as the lead screw nut turns, it may not move so that it moves the lead screw, with dovetail slide 86, radially along the head. It may be appreciated that a direct drive may not be desirable for all purposes, although the direct drive is particularly useful in making large adjustments prior to actual engagement of the cutting tool with a workpiece.

The radial drive has three different fine feeds. When shaft 128 is turned, pinion 132 drives gear 126. The pinion has 16 teeth, and the gear has 56 teeth, so that there is a reduction of 3½ to 1. A greater reduction is achieved when shaft 136 is turned since shaft 136 has pinion 140, which engages gear 134. Pinion 140 has 16 teeth, and gear 134 has 32 teeth, for a 2 to 1 reduction, so that there is a 7 to 1 reduction from shaft 136 to shaft 108. The finest feed is accomplished through rotation of shaft 144, which has pinion 150 mounted thereon. Pinion 150 meshes with gear 142, which is mounted on shaft 136. Pinion 150 has 16 teeth, and gear 142 has 32 teeth, so that there is a 2 to 1 reduction. Accordingly, there is a 14 to 1 reduction from shaft 144 to shaft 108.

The cutting tool is fed radially across the head while the head is rotating by selecting an appropriate shaft end and turning the shaft to feed the tool across the surface of the workpiece. It may be appreciated that the cutting tool is held securely in place since the dovetail slide is mounted in the head and at least the radius of the head supports the slide. The spindle is held securely by the thrust bearing at the end away from the head, while a roller and ball bearing supports the end adjacent to the head. Thus, the spindle has no wobble; and a flat surface may be cut with the instant device.

Although a specific embodiment of the herein-disclosed invention has been shown in the accompanying drawings and described in detail above, it is to be expressly understood that the instant invention is limited only by the appended claims.

What is claimed is:

1. A portable facing machine for cutting a flat face on a surface comprising; a frame adapted for providing support for the facing machine, a spindle support mounted on the frame and being longitudinally movable relative to the frame, a head depth control connected to the spindle support for selectively moving the spindle support longitudinally relative to the frame and selectively holding the spindle support in a selected position, a cutter support rotatably mounted in the spindle support and being movable longitudinally relative to the frame with the spindle support head, said cutter support including a head and a slide mounted in the head radially movable relative to the head, a cutting tool assembly mounted on the slide being rotatable with the cutter support and being radially movable relative to the head, a head drive connected to the head for rotating the cutter support in the spindle support, the head drive includes; an internal ring gear secured to the head of the cutter support, a drive pinion meshing with the ring gear, a drive shaft connected to the drive pinion and extending along the spindle support and being rotatably supported by a portion of the spindle support, and a fluid motor on the drive shaft for rotating the drive shaft, and a radial drive connected to the slide for selectively moving the cutting tool assembly radially relative to the head while the cutter support is rotating in the spindle support.

2. A portable facing machine for cutting a flat face on a surface comprising; a frame adapted for providing support for the facing machine, a spindle support mounted on the frame and being longitudinally movable relative to the frame, a head depth control connected to the spindle support for selectively moving the spindle support longitudinally relative to the frame and selectively holding the spindle support in a selected position, a cutter support rotatably mounted in the spindle support and being movable longitudinally relative to the frame with the spindle support head, said cutter support including a head and a slide mounted in the head radially movable relative to the head, a cutting tool assembly mounted on the slide being rotatable with the cutter support and being radially movable relative to the head, a head drive connected to the head for rotating the cutter support in the spindle support, and a radial drive connected to the slide for selectively moving the cutting tool assembly radially relative to the head while the cutter support is rotating in the spindle support, the radial drive includes; a housing having a plurality of input gear shafts extending outward from the housing, each of the shafts being connected to at least one adjacent shaft by gearing providing a speed reduction from one shaft to the next shaft, an input shaft rotatably mounted in the cutter support and being drivingly connected adjacent to one end to one of the input gear shafts, a bevel gear mounted at the other end of the input shaft, a second bevel gear meshing with the first-mentioned bevel gear, a lead screw nut drivingly connected to the second bevel gear, and a radial drive lead screw fixedly connected to the slide of the cutter support for being radially movable relative to the head and threadedly engaging the lead screw nut, whereby rotation of the input shaft moves the slide radially relative to the head.

3. A portable facing machine for cutting a flat face on a surface comprising; a frame adapted for providing support for the facing machine, a spindle support mounted on the frame and being longitudinally movable relative to the frame, a head depth control connected to the spindle support for selectively moving the spindle support longitudinally relative to the frame and selectively holding the spindle support in a selected position, the head depth control includes; a control ring connected to the spindle support, and a depth screw connected to the frame and being threadedly connected to the control ring; a cutter support rotatably mounted in the spindle support and being movable longitudinally relative to the frame with the spindle support head, said cutter support including a head and a slide mounted in the head radially movable relative to the head, a cutting tool assembly mounted on the slide being rotatable with the cutter support and being radially movable relative to the head, a head drive connected to the head for rotating the cutter support in the spindle support, said head drive includes; an internal ring gear secured to the head of the cutter support, a drive pinion meshing with the ring gear, a drive shaft connected to the drive pinion and extending along the spindle support and being rotatably supported by the spindle support, and a fluid motor connected to the drive shaft for rotating the drive shaft, and a radial drive connected to the slide for selectively moving the cutting tool assembly radially relative to the head while the cutter support is rotating in the spindle support.

4. A portable facing machine for cutting a flat face on a surface comprising; a frame adapted for providing support for the facing machine, a spindle support mounted on the frame and being longitudinally movable relative to the frame, the frame includes; an upper support ring in sliding engagement with the spindle support, a lower support ring in sliding engagement with the spindle support, a plurality of columns fixed to the upper support ring and to the lower support ring to maintain the support rings in a spaced relationship, and a leg connected to each of the columns, a head depth control connected to the spindle support for selectively moving the spindle support longitudinally relative to the frame and selectively holding the spindle support in a selected position, and said head depth control includes; a control ring connected to the spindle support, and a depth screw rotatably connected to the upper support ring and the lower support ring and being threadedly connected to the control ring, whereby rotation of the depth screw moves the control ring and the spindle support relative to the frame, a cutter support rotatably mounted in the spindle support and being movable longitudinally relative to the frame with the spindle support head, said cutter support including a head and a slide mounted in the head radially movable relative to the head, a cutting tool assembly mounted on the slide being rotatable with the cutter support and being radially movable relative to the head, a head drive connected to the head for rotating the cutter support in the spindle support, and a radial drive connected to the slide for selectively moving the cutting tool assembly radially relative to the head while the cutter support is rotating in the spindle support.

5. A portable facing machine for cutting a flat face on a surface comprising; a frame adapted for providing support for the facing machine, a spindle support mounted on the frame and being longitudinally movable relative to the frame, the frame includes; an upper support ring in sliding engagement with the spindle support, a lower support ring in sliding engagement with the spindle support, a plurality of columns fixed to the upper support ring and to the lower support ring to maintain the support rings in a spaced relationship, and a leg connected to each of the columns, a head depth control connected to the spindle support for selectively moving the spindle support longitudinally relative to the frame and selectively holding the spindle support in a selected position, a cutter support rotatably mounted in the spindle support and being movable longitudinally relative to the frame with the spindle support head, said cutter support including a head and a slide mounted in the head radially movable relative to the head, a cutting tool assembly mounted on the slide being rotatable with the cutter support and being radially movable relative to the head, a head drive connected to the head for rotating the cutter support in the spindle support, said head drive includes; an internal ring gear secured to the head of the cutter support, a drive pinion meshing with the ring gear, a drive shaft connected to the drive pinion and extending along the spindle support through the upper support ring and the lower support ring and being rotatably supported by a portion of the spindle support, and a fluid motor connected to the drive shaft for rotating the drive shaft, and a radial drive connected to the slide for selectively moving the cutting tool assembly radially relative to the head while the cutter support is rotating in the spindle support.

6. A portable facing machine for cutting a flat face on a surface comprising; a frame adapted for providing support for the facing machine, a spindle support mounted on the frame and being longitudinally movable relative to the frame, a head depth control connected to the spindle support for selectively moving the spindle support longitudinally relative to the frame and selectively holding the spindle support in a selected position, the head depth control includes; a control ring connected to the spindle support, and a depth screw connected to the frame and being threadedly connected to the control ring; a cutter support rotatably mounted in the spindle support and being movable longitudinally relative to the frame with the spindle support head, said cutter support including a head and a slide mounted in the head radially movable relative to the head, a cutting tool assembly mounted on the slide being rotatable with the cutter support and being radially movable relative to the head, a head drive connected to the head for rotating the cutter support in the spindle support, said head drive includes; an internal ring gear secured to the head of the cutter support, a drive pinion meshing with the ring gear, a drive shaft connected to the drive pinion and extending along the spindle support and being rotatably supported by a portion of the spindle support, and a fluid motor connected to the drive shaft for rotating the drive shaft; and a radial drive connected to the slide for selectively moving the cutting tool assembly radially relative to the head while the cutter support is rotating in the spindle support, the radial drive includes; an input gear box mounted on the spindle support opposite the head, an input shaft drivingly connected to the input gear box and being rotatably mounted in the cutter support, a bevel gear drive connected to the input shaft, and a radial drive lead screw mounted in the slide of the cutter assembly and being connected to the bevel gear drive.

7. A portable facing machine for cutting a flat face on a surface comprising; a frame adapted for providing support for the facing machine, a spindle support mounted on the frame and being longitudinally movable relative to the frame, a head depth control connected to the spindle support for selectively moving the spindle support longitudinally relative to the frame and selectively holding the spindle support in a selected position, a cutter support rotatably mounted in the spindle support and being movable longitudinally relative to the frame with the spindle support head, said cutter support including a head and a slide mounted in the head radially movable relative to the head, a longitudinally hollow spindle rotatably mounted in the spindle support, said head being mounted on the spindle and having a dovetail slide groove extending diametrically across one side of the head, said slide mating with the dovetail slide groove; a cutting tool assembly mounted on the slide being rotatable with the cutter support and being radially movable relative to the head, a head drive connected to the head for rotating the cutter support in the spindle support, and a radial drive connected to the slide for selectively moving the cutting tool assembly radially relative to the head while the cutter support is rotating in the spindle support, said radial drive having an input shaft positioned in the spindle and having one end connected to the slide for radially positioning the slide relative to the head; said head drive includes; an internal ring gear secured to the head, a drive pinion meshing with the ring gear, a drive shaft connected to the drive pinion and extending along the spindle support and being rotatably supported by a portion of the spindle support, and a fluid motor connected to the drive shaft for rotating the drive shaft; and said head depth control includes; a control ring connected to the spindle support, and a depth screw connected to the frame and being threadedly connected to the control ring, whereby rotation of the screw moves the control ring and the spindle support relative to the frame.

8. A portable facing machine for cutting a flat face on a surface comprising; a frame adapted for providing support for the facing machine, a spindle support mounted on the frame and being longitudinally movable relative to the frame, a head depth control connected to the spindle support for selectively moving the spindle support longitudinally relative to the frame and selectively holding the spindle support in a selected position, the head depth control includes; a control ring connected to the spindle support, and a depth screw connected to the frame and being threadedly connected to the control ring; a cutter support rotatably mounted in the spindle support and being movable longitudinally relative to the frame with the spindle support head, said cutter support including a head and a slide mounted in the head radially movable relative to the head, a cutting tool assembly mounted on the slide being rotatable with the cutter support and being radially movable relative to the head, a head drive connected to the head for rotating the cutter support in the spindle support, said head drive includes; an internal ring gear secured to the head, a drive pinion meshing with the ring gear, a drive shaft connected to the drive pinion and extending along the spindle support and being rotatably supported by a portion of the spindle support, and a fluid motor connected to the drive shaft for rotating the drive shaft; and a radial drive connected to the slide for selectively moving the cutting tool assembly radially relative to the head while the cutter support is rotating in the spindle support; and the radial drive includes; a housing having a plurality of input gear shafts extending outward from the housing, each of the shafts being connected to at least one adjacent shaft by gearing providing a speed reduction from one shaft to the next shaft, an input shaft rotatably mounted in the cutter support and being drivingly connected adjacent to one end to one of the input gear shafts, a bevel gear mounted at the other end of the input shaft, a second bevel gear meshing with the first-mentioned bevel gear, a lead screw nut drivingly connected to the second bevel gear, a radial drive lead screw fixedly connected to the slide and threadedly engaging the lead screw nut, whereby rotation of the input shaft moves the slide radially in the head.

9. A portable facing machine for cutting a flat face on a surface comprising; a frame adapted for providing support for the facing machine, a spindle support mounted on the frame and being longitudinally movable relative to the frame, the cutter support includes a longitudinally hollow spindle rotatably mounted in the spindle support, said head being mounted on the spindle and having a dovetail slide groove extending diametrically across one side of the head, said slide mating with the dovetail slide groove; a head depth control connected to the spindle support for selectively moving the spindle support longitudinally relative to the frame and selectively holding the spindle support in a selected position, said head depth control includes; a control ring connected to the spindle support, and a depth screw rotatably connected to the frame and being threadedly connected to the control ring; a cutter support rotatably mounted in the spindle support and being movable longitudinally relative to the frame with the spindle support head, said cutter support including a head and a slide mounted in the head radially movable relative to the head, a cutting tool assembly mounted on the slide being rotatable with the cutter support and being radially movable relative to the head, a head drive connected to the head for rotating the cutter support in the spindle support, and a radial drive connected to the slide for selectively moving the cutting tool assembly radially relative to the head while the cutter support is rotating in the spindle support, the radial drive includes; a housing having a plurality of input gear shafts extending outward from the housing, each of the shafts being connected to at least one adjacent shaft by gearing providing a speed reduction from one shaft to the next shaft, an input shaft rotatably mounted in the spindle and being drivingly connected adjacent to one end to one of the input gear shafts, a bevel gear mounted at the other end of the input shaft, a second bevel gear meshing with the first-mentioned bevel gear, a lead screw nut drivingly connected to the second bevel gear, and a radial drive lead screw fixedly connected to the slide and threadedly engaging the lead screw nut, whereby rotation of the input shaft moves the slide radially relative to the head.

10. A portable facing machine for cutting a flat face on a surface comprising; a frame adapted for providing support for the facing machine, a spindle support mounted on the frame and being longitudinally movable relative to the frame, a head depth control connected to the spindle support for selectively moving the spindle support longitudinally relative to the frame and selectively holding the spindle support in a selected position, a cutter support rotatably mounted in the spindle support and being movable longitudinally relative to the frame with the spindle support head, said cutter support including a head and a slide mounted in the head radially movable relative to the head, a longitudinally hollow spindle rotatably mounted in the spindle support, said head being mounted on the spindle and having a dovetail slide groove extending diametrically across one side of the head, said slide mating with the dovetail slide groove; said frame includes; an upper support ring in sliding engagement with the spindle support and a lower support ring in sliding engagement with the spindle support, a plurality of columns fixed to the upper support ring and to the lower support ring to maintain the support rings in a spaced relationship, and a leg connected to each of the columns; said head depth control includes; a control ring connected to the spindle support, and a depth screw rotatably connected to the frame and being threadedly connected to the control ring; a cutting tool assembly mounted on the slide being rotatable with the cutter support and being radially movable relative to the head, a head drive connected to the head for rotating the cutter support in the spindle support, said head drive includes; an internal ring gear secured to the head, a drive pinion meshing with the ring gear, a drive shaft connected to the drive pinion and extending along the spindle support and being rotatably supported by a portion of the spindle support, and a fluid motor connected to the drive shaft for rotating the drive shaft; and a radial drive connected to the slide for selectively moving the cutting tool assembly radially relative to the head while the cutter support is rotating in the spindle support, the radial drive includes; a housing having a plurality of input gear shafts extending outward from the housing, each of the shafts being connected to at least one adjacent shaft by gearing providing a speed reduction from one shaft to the next shaft, an input shaft rotatably mounted in the spindle and being drivingly connected adjacent to one end to one of the input gear shafts, a bevel gear mounted on the other end of the input shaft, a second bevel gear meshing with the first-mentioned bevel gear, a lead screw nut drivingly connected to the second bevel gear, and a radial drive lead screw fixedly connected to the slide and threadedly engaging engaging the lead screw nut, whereby rotation of the input shaft moves the slide radially relative to the head.

11. A portable facing machine for cutting a flat face on a surface comprising; an upper support ring, a lower support ring spaced from the upper support ring, a plurality of columns, each of said columns having one end fixed to the upper support ring and the other end fixed to the lower support ring to hold the rings in alignment and spaced from each other, a leg removably mounted on each of the columns, a housing slideably mounted in the support rings, said housing having a groove, a lock mounted in the lower support ring positioned in the groove to prevent the housing from rotating in the support rings, a head plate connected to one end of the housing, a cover plate mounted on the other end of the housing, a control ring secured to the housing, a depth lead screw threadedly connected to the control ring and being rotatably mounted in the support rings for moving the housing relative to the support rings and holding the housing in a selected position, a spindle rotatably mounted in the housing, a head fixed to the spindle, said head having a dovetail slide groove on the side spaced away from the spindle, said head having a cylindrical side wall having one end positioned adjacent to the head plate, a dovetail slide mateable with the dovetail slide groove and being slideably mounted therein, a tool holder mounted on the dovetail slide, a cutting tool mounted in the tool holder, an internal gear mounted in the head adjacent to the side wall, a drive pinion meshing with the internal ring gear, a drive shaft fixed to the drive pinion extending through the head plate and being rotatably mounted in the upper support ring and the lower support ring, a fluid motor assembly connected to the drive shaft for rotating the drive shaft, a radial lead screw fixed to the dovetail slide, a lead screw nut threadedly mounted on the radial drive lead screw, a driven bevel gear fixed to the lead screw nut for rotation with the nut, a drive bevel gear meshing with the driven bevel gear, an input shaft having one end fixed to the driven bevel gear and extending through the spindle, a shaft gear fixed to the input shaft adjacent to the other end of the input shaft, a first drive pinion meshing with the shaft gear, a first gear shaft rotatably supporting the first drive pinion, a second drive gear fixed to the first gear shaft, a second drive pinion meshing with the second drive gear, a second gear shaft rotatably supporting the second drive pinion, a third drive gear mounted on the second gear shaft, a third drive pinion meshing with the third drive gear, a third gear shaft supporting the third drive pinion, and each of said gear shafts having one end adapted for connection to a drive to rotate the respective shaft.

* * * * *